(12) United States Patent
Van Den Boeck et al.

(10) Patent No.: US 7,486,661 B2
(45) Date of Patent: Feb. 3, 2009

(54) METHOD FOR OPTIMIZING THE USE OF NETWORK RESOURCES FOR THE TRANSMISSION OF DATA SIGNALS, SUCH AS VOICE, OVER AN IP-PACKET SUPPORTING NETWORK

(75) Inventors: Wim Van Den Boeck, Boutersem (BE); Kristiaan Johan Hubert Ghislanus Venken, Schilde (BE)

(73) Assignee: Alcatel, Paris (FR)

( * ) Notice: Subject to any disclaimer, the term of this patent is extended or adjusted under 35 U.S.C. 154(b) by 1507 days.

(21) Appl. No.: 10/290,186

(22) Filed: Nov. 8, 2002

(65) Prior Publication Data
US 2003/0091033 A1 May 15, 2003

(30) Foreign Application Priority Data
Nov. 9, 2001 (EP) ................... 01402880

(51) Int. Cl.
*H04L 12/66* (2006.01)
(52) U.S. Cl. .............. 370/352; 370/356; 370/401
(58) Field of Classification Search .......... 370/328, 370/338, 352–356, 389, 401; 381/328, 338, 381/352–356, 389, 401
See application file for complete search history.

(56) References Cited

U.S. PATENT DOCUMENTS

| 5,867,663 A | 2/1999 | McClure et al. |
| 6,014,375 A | 1/2000 | Janky |
| 6,070,089 A | 5/2000 | Brophy et al. |
| 6,600,738 B1 * | 7/2003 | Alperovich et al. ......... 370/352 |
| 6,751,477 B1 * | 6/2004 | Alperovich et al. ......... 370/352 |

FOREIGN PATENT DOCUMENTS

| WO | WO 99/66736 A2 | 12/1999 |
| WO | WO 00/31996 A2 | 6/2000 |
| WO | WO 01/26390 A1 | 4/2001 |

OTHER PUBLICATIONS

ANON: "White Paper—Migrating to Multiservice Networks—A planning guide" CISCO, 'Online! Jul. 9, 2001, pp. 1-23, XP002212052.

* cited by examiner

*Primary Examiner*—Suhan Ni
(74) *Attorney, Agent, or Firm*—Sughrue Mion, PLLC

(57) ABSTRACT

A method for optimizing the use of network resources for the transmission of data signals, such as voice frames, between network units over an IP-packet supporting network. The data frames are obtained using codecs, which may have a different mouth-to-ear transmission delay, from data samples, e.g. voice samples, that are formatted and to which a data frame header is added. The method includes attributing codec categories to each of the data or voice frames according to the codecs by means of which the data samples are generated, each codec category corresponding to a different mouth-to-ear delay budget range for the data frames; sorting the data frames according to their codec categories; generating multiplexed cells from data frames of a same codec category, each multiplexed cell being obtained by multiplex aggregation of a predetermined number of voice samples; and transporting the multiplexed cells from an ingress router to an egress router in the IP-network.

7 Claims, 3 Drawing Sheets

METHOD FOR OPTIMIZING THE USE OF NETWORK RESOURCES FOR THE TRANSMISSION OF DATA SIGNALS, SUCH AS VOICE, OVER AN IP-PACKET SUPPORTING NETWORK

BACKGROUND OF THE INVENTION

The invention relates to a method for optimizing the use of network resources for transmission of data frames, e.g. voice frames between network units in an IP-packet supporting network. The data frames being obtained from data samples that are formatted and to which a data frame header is added. Each codec having a different mouth-to-ear transmission delay budgets for the data frame derived from it.

Transmission of packetized data signals in an IP-supporting network may require a significant part of network resources. This is particularly true when the data signals are voice signals and when a large number of user streams arriving together needs to be transmitted between network routers and for instance between two multimedia gateways [MGW] of an Universal Mobile Telecommunication System [UMTS] network. As known, all the user voice streams collected at the level of an ingress router do not necessarily come from the same type of codec and some codecs have longer tolerable mouth-to-ear transmission delays than others for obtaining good quality communication, defined as "delay budgets". Particularly, use of adaptative multi-rate [AMR] and of adaptative multi-rate wideband [AMR-WB] codecs for voice coding is opted by the UMTS standardization organization 3GPP, and accordingly, codecs producing a discrete number of different codec rates are authorized. Dynamical changes of codec rates during calls are foreseen taking for instance into account changes of the quality of transmission for the voice over the air link and optimization arguments for bandwidth usage. As known adequate sharing of the available bandwidth on a link is very important.

A known approach to reduce bandwidth needed for transmission implies the multiplexing of several data frames in a same packet or cell for an Internet protocol IP based transport of data frames, this being advocated in the UMTS terrestrial radio access network UTRAN standardization process promoted by 3GPP. A multiplexing protocol over IP, such as composite Internet protocol is proposed for this purpose, it is also applicable to other telecommunication networks where multiplexing of payloads is possible.

If the data frames to be multiplexed in a same IP cell are voice frames involving different delay requirements, the delay for this IP cell needs to be the lowest of the individual delay bounds. Stricter delay bounds mean higher resource reservations in the IP network and consequently a less efficient use of the network resources and a higher cost for the end-user.

SUMMARY OF THE INVENTION

An object of this invention is to provide a method for optimizing the use of network resources for the transmission of data frames, for instance voice frames, between network units in an Internet protocol [IP] supporting network.

According to the invention, this object is achieved due to the fact that the method includes the steps of:
attributing codec categories to each of said data frames according to the codec by means of which the data samples are generated, each codec category corresponding to a different mouth-to-ear delay budget range for the frames;
sorting out the data frames according to their codec categories;
generating multiplexed cells from data frames of a same codec category, each multiplexed cell being obtained by multiplex aggregation of a predetermined number of data samples; and of
transporting said multiplexed cells from an ingress router to an egress router in said Internet Protocol [IP] supporting network.

In this way, the different treatment of packets having different delay requirements, i.e. different codec categories, allows a more efficient bandwidth usage. Stricter delay budget bounds, existing if no such differentiation is made, mean higher resource reservations necessary in the IP network and consequently a less efficient use of the network resources and a higher cost for the end-user.

This and other objects, advantages and features of the invention will become more apparent from the following description thereof taken in conjunction with the accompanying drawings whereof:

DETAILED DESCRIPTION OF EXEMPLARY EMBODIMENTS OF THE INVENTION

Figure 1:
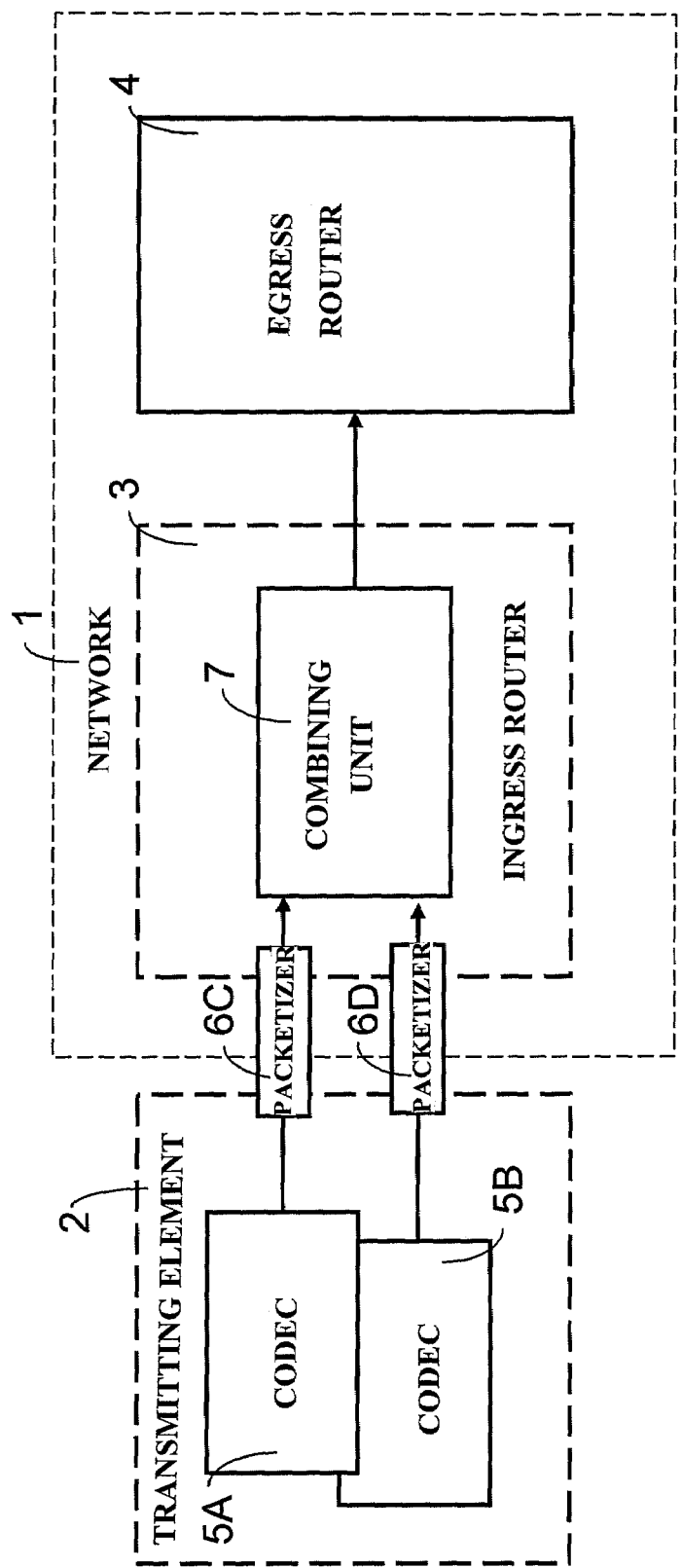
FIG. 1 is a functional view of the part of a communication system allowing the implementation of the method according to the invention.

An example of a telecommunication system to which the method according to the invention can be applied is illustrated at FIG. 1. The telecommunication system shown includes a network 1 and a plurality of voice transmitting terminals or equipments here considered as elements of a transmitting entity 2. The network 1 is supposed to be an Internet Protocol [IP] packet supporting network. It comprises nodes or units and particularly units serving as ingress, egress and/or core routers, such as an ingress router 3 and egress or core router 4. These two routers 3 and 4 are for instance two multimedia gateways [MGW] that are part of an UMTS network.

Codecs, such as 5A and 5B, are associated to user terminals or equipments to sample and digitally code data signals, here preferably voice signals, before transmission to an ingress router. Voice samples are obtained at the output of a codec according to a determined time frame, which is usually standardized.

The streams of voice samples generated at the output of the codecs do not necessarily have the same codec rate. As it is known, adaptative multi-rate [AMR] codecs and adaptative multi-rate wide-band [AMR WB] codecs are able to generate data streams at different source rates, corresponding to codec modes, for instance from 4,75 to 12,2 kb/s.

Streams of voice samples generated by codecs are transmitted to packetizers, such as for instance 6C and 6D, in order to render possible their formatting.

As known from the person normally skilled in the art, codecs and/or packetizers are either individual or shared equipments and they can also be grouped in units comprising one or several codecs with at least one packetizer. This will not be developed further, as such arrangements do not directly relate to the object of the invention.

The aggregation of frames obtained from the packetizers 6C, 6D, is supposed to be obtained in a combining unit, such as unit 7, which provides a supplementary packetization into composite packets, further referred to as cells, before further transmission and which is supposed here to be located in ingress router 3, knowing that it could also be located outside of this ingress router. The problem to be solved is how to handle voice payloads provided by the codecs from digital voice signals and to be transmitted, by means of multiplexed cells, between two network routers, more particularly on a determined link and by means of a determined interface.

Packet multiplexing needs to be based on a multiplexing protocol over IP, such as for instance composite Internet protocol [CIP], defined within the framework of the UMTS terrestrial radio access network [UTRAN]. Such CIP protocol has an aggregation functionality, which allows multiplexing different CIP packets of variable sizes into one container to form a composite packet, herein referred to as a cell. Such an aggregation functionality can be expanded to other networks allowing IP-payloads multiplexing and it is particularly foreseen at an interface level between two multimedia gateways of a UMTS network.

Using CIP as a non-limiting example, it is reminded that a CIP container or composite packet has a general format with an IP header and a user datagram protocol [UDP] header for the container. This container comprises a CIP container header and a CIP container payload. The latter includes CIP packet loads with their respective CIP packet headers. The CIP header includes a context identifier CID, a payload length section and a sequence number section. The context identifier includes correction codes CRC and flags for multiplexing. The payload length section defines the length of the CIP packet payload and is used for aggregation. The sequence number section includes an end flag when large frame protocol packet data units [FP PDU] are segmented and a sequence number for reassembling segmented packets.

A simplified CIP protocol or a functionally equivalent protocol over IP could be used for the transport of voice frames.

Packet multiplexing allows an overhead reduction, but it also could create delays, for instance if the multiplexed packets are too long, such long packets being for instance obtained when too many streams are multiplexed.

As different codecs do not compulsorily have the same characteristics, they do not necessarily have the same mouth-to-ear transmission delay budget. As, known, the total mouth-to-ear [M2E] delay, i.e. $T_{M2E}$, can be seen as build up out of the following different parts:

$$T_{M2E} = Twait + Tser + Tprop$$

with $$Twait = Tqueue + Tblock + Tpack$$

The queuing delay Tqueue is the time to get scheduled a voice queue, which depends on the voice packet size, the offered load and the service time of the voice queue. The blocking delay Tblock is the delay caused by the serving of the preceding ongoing packet. The packetization delay Tpack is the time during which real time packets have to wait before the IP/CIP datagrams are filed up, it is supposed negligible. The serialization delay Tser of a packet corresponds to the time between the transmission of the first and the last bit of a packet, the propagation delay Tprop is of 5 µs/km, both delays are considered as negligible.

Mouth-to-ear delay budget for a transmission, i.e. the maximum tolerable delay for good quality communication, is dependent of the distortion and thus the codec type and mode (codec rate). Codec modes with a high codec-rate have larger mouth-to-ear transmission delay budgets than codec modes with lower rates, as already indicated above. Accordingly, multiplexing, in a same packet, voice payloads provided for by codecs having different codec-rates and inducing different delay requirements does not correspond to an optimized solution.

So, according to the invention, voice frames are multiplexed according to their codec type and mode or group of codec (types and) modes to form composite voice packets containing voice frames with the same delay requirements before being transmitted through at least a part of a network allowing IP multiplexing and particularly from an ingress router to another router.

As codec types and modes with a high codec-rate have a larger mouth-to-ear transmission delay budget than codec types and modes with a lower codec-rate, transmission of voice frames with same delay requirements can be optimized by modulation of the number of packets per IP cell. The number of packets per cell can be increased when the packets are provided for by a codec belonging to a codec category having a large M2E delay budget, when compared with packets provided for by a codec belonging to a codec category with a smaller M2E delay budget.

Figure 2:
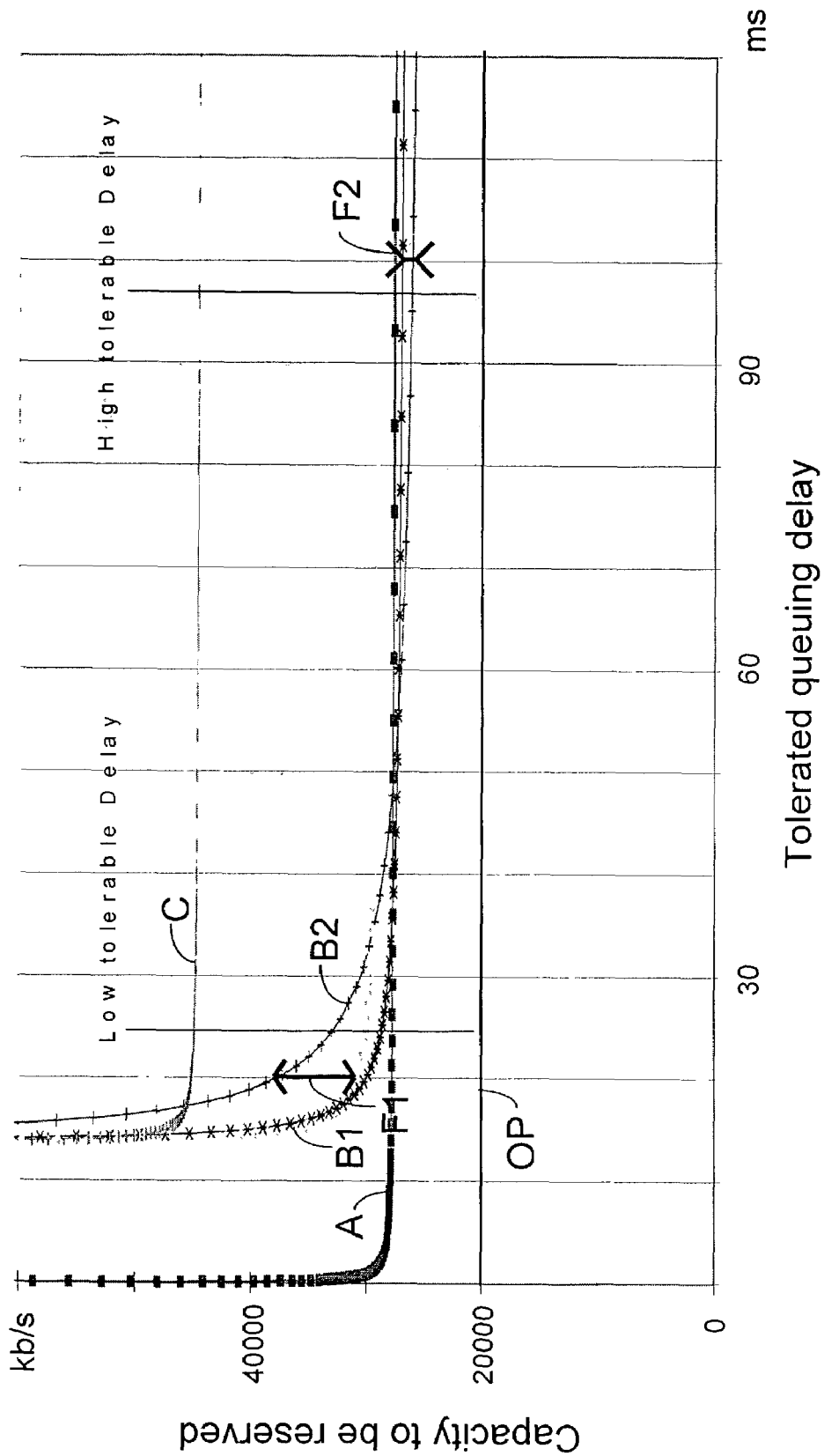
FIG. 2 is a graph of the bandwidth to be reserved for a constant offered load in relation with the transmission delay and the number of packets multiplexed in a cell or composite packet, in predetermined conditions.

As illustrated on FIG. 2, the bandwidth needed for a transmission, and consequently the capacity to be reserved depends on the M2E delay budget. This is pointed out by simulation graph, which relates to capacity to be reserved in kb/s, versus tolerated queuing delay in ms. The graph includes several plots respectively corresponding to the handling of a same offered payload, generated by one specific codec type and mode, according to different multiplexing schemes, the offered payload being referenced OP.

Graph A corresponds to asynchronous transfer mode/ATM adaptation layer 2/frame protocol or ATM/AAL2/FP stack. B1 and B2 correspond respectively to composite Internet protocol/frame protocol [CIP/FP] stack for respectively 50 and 10 voice frames multiplexed. Graph C corresponds to an Internet protocol/frame protocol stack without multiplexing.

Graphs A, B1 and B2 show that the bandwidth capacity to be reserved is far less important with ATM/AAL2/FP or IP/CIP/FP stacks than with IP/FP stack corresponding to graph C. They also indicate that the bandwidth requirements decrease according to an exponential-like function of tolerated delays. A large capacity is required when the delay is short and for instance shorter than 30 ms, it is far lower and practically constant for longer delays. As pointed out by arrows F1 and F2 the difference existing between graphs B1 and B2, which is important when the mouth-to-ear transmission delay budget is below a chosen low tolerable delay value of 25 ms, become less significant when the delay budgets are longer. This is also true when graph A is considered.

Figure 3:
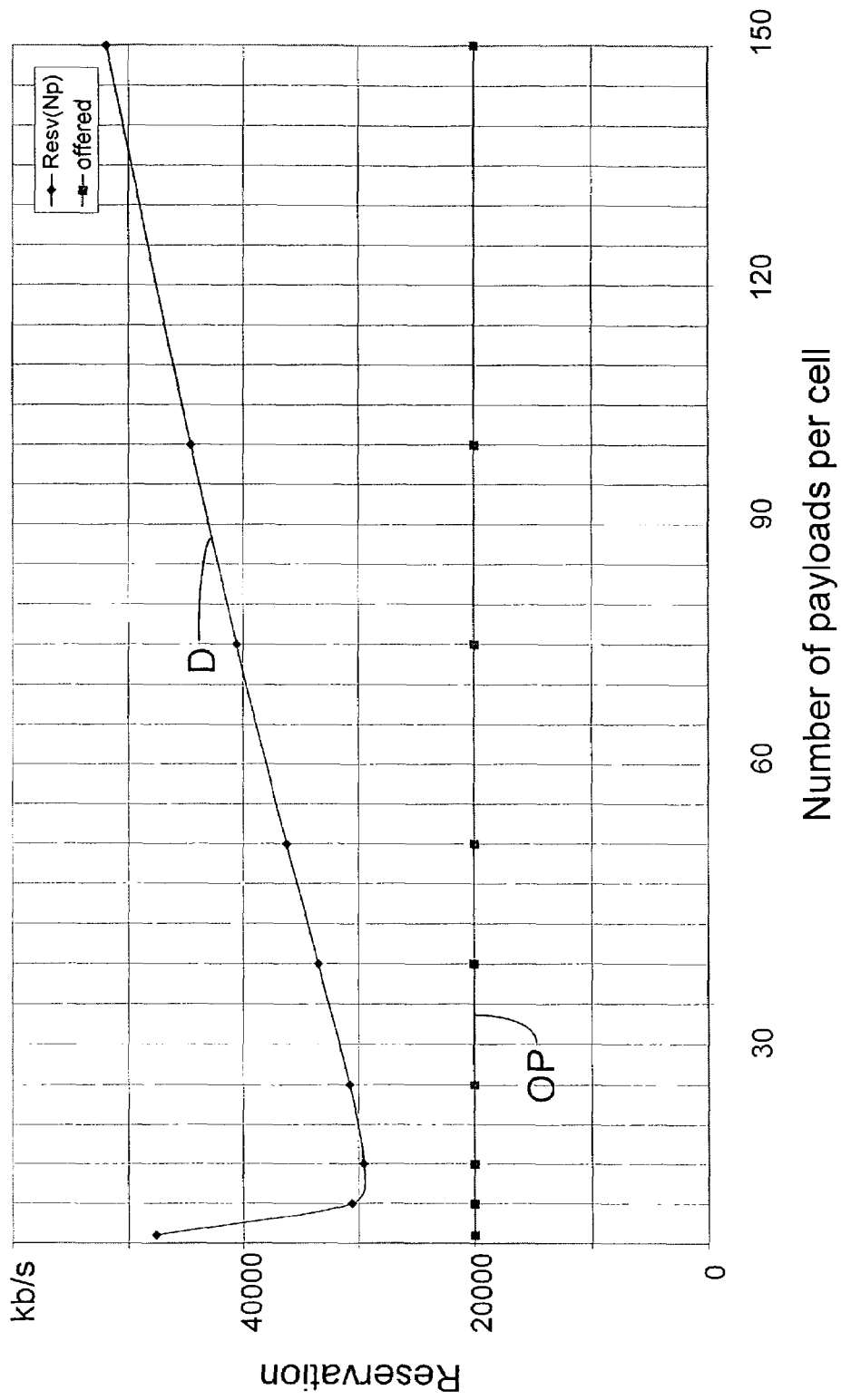
FIG. 3 is a graph of the bandwidth to be reserved in function of the number of voice frames per cell, for a given transmission delay and where all voice samples are generated with the same codec rate.

Large delay budgets allow multiplexing more packets, here more voice frames, than smaller delays but a limit can be drawn from simulations made in same conditions as for FIG. 2, for a worst case scenario according to which a very small delay budget of 21 ms is taken into account between two multimedia gateways in the UMTS core backbone. As shown on FIG. 3, bandwidth to be reserved in the above mentioned conditions increases drastically with the number of payloads per cell according to graph D, with better values when the number of payloads is in an interval of six to ten payloads. This number increases when a delay budget between routers larger than 21 ms is taken into account and different optimal multiplexing numbers are obtainable in relation with different delay budgets.

So, according to the invention, voice frames belonging to the same codec category, all belonging to the same mouth-to-ear delay budget range are multiplexed together, to form cells comprising a determined number of multiplexed voice frames, this number being chosen for every cell in relation with the mouth-to-ear delay of the frames to be included in the cell.

In a preferred form of realization, voice samples which are provided by codecs are formatted and are added a Frame Protocol [FP] header, are marked according to their respective category, a determined category concerning either identical codecs or codecs of one or several determined type and mode(s), having a same or practically same delay budget. Codecs of a determined category include for instance codecs having successive bitrates in a determined range.

Every cell, which is obtained from voice frames, includes a header containing an identification mark related to the codec category common to all the voice samples it contains. Such identification marks are for instance obtained from the codec type field defined according to the frame protocol in use for the voice frames. The reduction of required bandwidth, which is obtained when applying the method according to the invention, is consequently a cost reduction for the network operator.

Discrimination of voice samples according to their respective originating codec type and mode is realized before packetization by aggregation. It is for instance based on the marks provided for according to the frame protocol by means of which voice samples are transmitted, they could also be derived from the frame architectures.

Aggregation is for instance realized at the level of edge routers.

The invention claimed is:

1. A method for optimizing the use of network resources for the transmission of data frames between network units in an Internet Protocol (IP) supporting network, wherein said data frames are obtained from data samples that are formatted and to which a data frame header is added, the data samples being generated by codecs, said codecs having different mouth-to-ear transmission delay budgets for the data frames derived therefrom, wherein said method comprises:
attributing codec categories to each of said data frames according to the codec by means of which the data samples are generated, each codec category corresponding to a different mouth-to-ear delay budget range for the data frames;
sorting out the data frames according to their codec categories;
generating multiplexed cells from data frames of a same codec category, each multiplexed cell being obtained by multiplex aggregation of a predetermined number of data samples; and
transporting said multiplexed cells from an ingress router to an egress router in said IP supporting network.

2. The method according to claim 1, wherein said predetermined number of data samples corresponds to a relatively low bandwidth reservation requirement for the transmission of said multiplexed cells, and is a function of parameters such as said codec category, available resources, delay budget, network load and network topology.

3. The method according to claim 1, wherein said codec category is attributed in function of the contents of said data frame.

4. The method according to claim 1, wherein said codec category is attributed in function of the architecture of said data frame.

5. The method according to any of the claims 1, 2 or 3, wherein said method further includes a step of marking each data frame according to the codec category attributed thereto.

6. The method according to claim 1, wherein each of said multiplexed cells has a header, and in that said header is marked according to the codec category of the data frames belonging to said multiplexed cell.

7. The method according to claim 1, wherein said data frames are voice frames, and in that said data samples are voice samples.

* * * * *